United States Patent
Gururaj et al.

(10) Patent No.: US 10,742,724 B2
(45) Date of Patent: Aug. 11, 2020

(54) CLUSTER COMPUTER SYSTEM WITH FAILOVER HANDLING

(71) Applicant: HEWLETT PACKARD ENTERPRISE DEVELOPMENT LP, Houston, TX (US)

(72) Inventors: Prabhanjan Gururaj, Bangalore (IN); Balaji Venkatraman, Bangalore (IN); Guhendran Devendran, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 176 days.

(21) Appl. No.: 15/679,483

(22) Filed: Aug. 17, 2017

(65) Prior Publication Data

US 2019/0058762 A1    Feb. 21, 2019

(51) Int. Cl.
*G06F 11/20* (2006.01)
*H04L 29/08* (2006.01)
*G06F 9/48* (2006.01)
*G06F 9/50* (2006.01)
*H04L 29/14* (2006.01)
(Continued)

(52) U.S. Cl.
CPC ........ *H04L 67/1034* (2013.01); *G06F 9/4856* (2013.01); *G06F 9/5061* (2013.01); *G06F 11/202* (2013.01); *G06F 11/1425* (2013.01); *G06F 2209/505* (2013.01); *H04L 41/0654* (2013.01); *H04L 67/1029* (2013.01); *H04L 69/40* (2013.01)

(58) Field of Classification Search
CPC ............................... G06F 11/20; G06F 11/202

USPC .......................................................... 714/4.11
See application file for complete search history.

(56) References Cited

U.S. PATENT DOCUMENTS

| | | | |
|---|---|---|---|
| 6,401,120 B1 * | 6/2002 | Gamache ............ | G06F 11/1482 709/220 |
| 6,438,705 B1 * | 8/2002 | Chao ................... | G06F 11/1425 714/4.11 |

(Continued)

OTHER PUBLICATIONS

Easy, Automated Availability for Critical Aix Data and Applications, (Web Page), Retrieved Jun. 20, 2017, 3 Pgs., https://world.visionsolutions.com/products/High-Availability-DT-AIX.aspx.

*Primary Examiner* — Kamini B Patel
(74) *Attorney, Agent, or Firm* — Hewlett Packard Enterprise Patent Department

(57) ABSTRACT

Some examples described herein relate to a cluster computer system. In an example, a first node in a cluster computer system may determine that a second node has become unavailable. The first node may form a first sub-cluster with a plurality of nodes that are communicatively reachable in the cluster computer system. The first node may retain ownership over a first application running on the first node, to the exclusion of remaining nodes in the first sub-cluster, wherein retaining ownership over the first application comprises controlling access to a storage volume related to the first application. The first node may attempt to obtain ownership over a second application previously running on the second node before the second node became unavailable. In response to a successful attempt the first node may obtain ownership over the second application, to the exclusion of remaining nodes in the first sub-cluster.

19 Claims, 7 Drawing Sheets

(51) Int. Cl.
 *H04L 12/24* (2006.01)
 *G06F 11/14* (2006.01)

(56) References Cited

U.S. PATENT DOCUMENTS

| | | | | |
|---|---|---|---|---|
| 6,662,219 B1* | 12/2003 | Nishanov | ................ | H04L 29/06 709/209 |
| 7,739,541 B1* | 6/2010 | Rao | .................... | G06F 11/0709 709/205 |
| 7,774,469 B2 | 8/2010 | Massa et al. | | |
| 8,286,026 B2* | 10/2012 | Rao | .................... | G06F 11/2028 714/4.1 |
| 8,874,954 B1* | 10/2014 | Gupte | ................. | G06F 11/2028 714/1 |
| 8,977,888 B1* | 3/2015 | Bafna | ................. | G06F 11/1415 714/4.11 |
| 9,077,580 B1* | 7/2015 | Randhawa | ............. | H04L 29/06 |
| 9,098,392 B1* | 8/2015 | Gadiraju | ............. | G06F 11/2023 |
| 9,448,966 B2* | 9/2016 | Varakur | .................. | G06F 15/80 |
| 2002/0194429 A1* | 12/2002 | Chiu | ................... | G06F 12/0813 711/118 |
| 2003/0065782 A1* | 4/2003 | Nishanov | .............. | G06F 9/5011 709/226 |
| 2007/0168507 A1* | 7/2007 | Das | ....................... | H04L 63/104 709/225 |
| 2008/0209136 A1* | 8/2008 | Qi | ......................... | G06F 3/0622 711/148 |
| 2010/0306573 A1* | 12/2010 | Gupta | ................ | G06F 11/1425 714/4.1 |
| 2012/0179771 A1* | 7/2012 | Ganti | ................. | G06F 11/1425 709/213 |
| 2015/0269039 A1* | 9/2015 | Akirav | ................ | G06F 11/2007 714/4.11 |
| 2017/0094003 A1* | 3/2017 | Gahlot | .................. | H04L 47/746 |
| 2017/0116095 A1* | 4/2017 | Schatz | ................ | G06F 11/2033 |
| 2018/0007129 A1* | 1/2018 | Gahlot | ............... | H04L 67/1034 |

* cited by examiner

CLUSTER COMPUTER SYSTEM WITH FAILOVER HANDLING

BACKGROUND

Cluster computing evolved as a means of doing parallel computing work in the 1960s. Arguably, one of the primary motivations that led to cluster computing was the desire to link multiple computing resources, which were underutilized, for parallel processing. Computer clusters may be configured for different purposes, for example, high-availability and load balancing.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
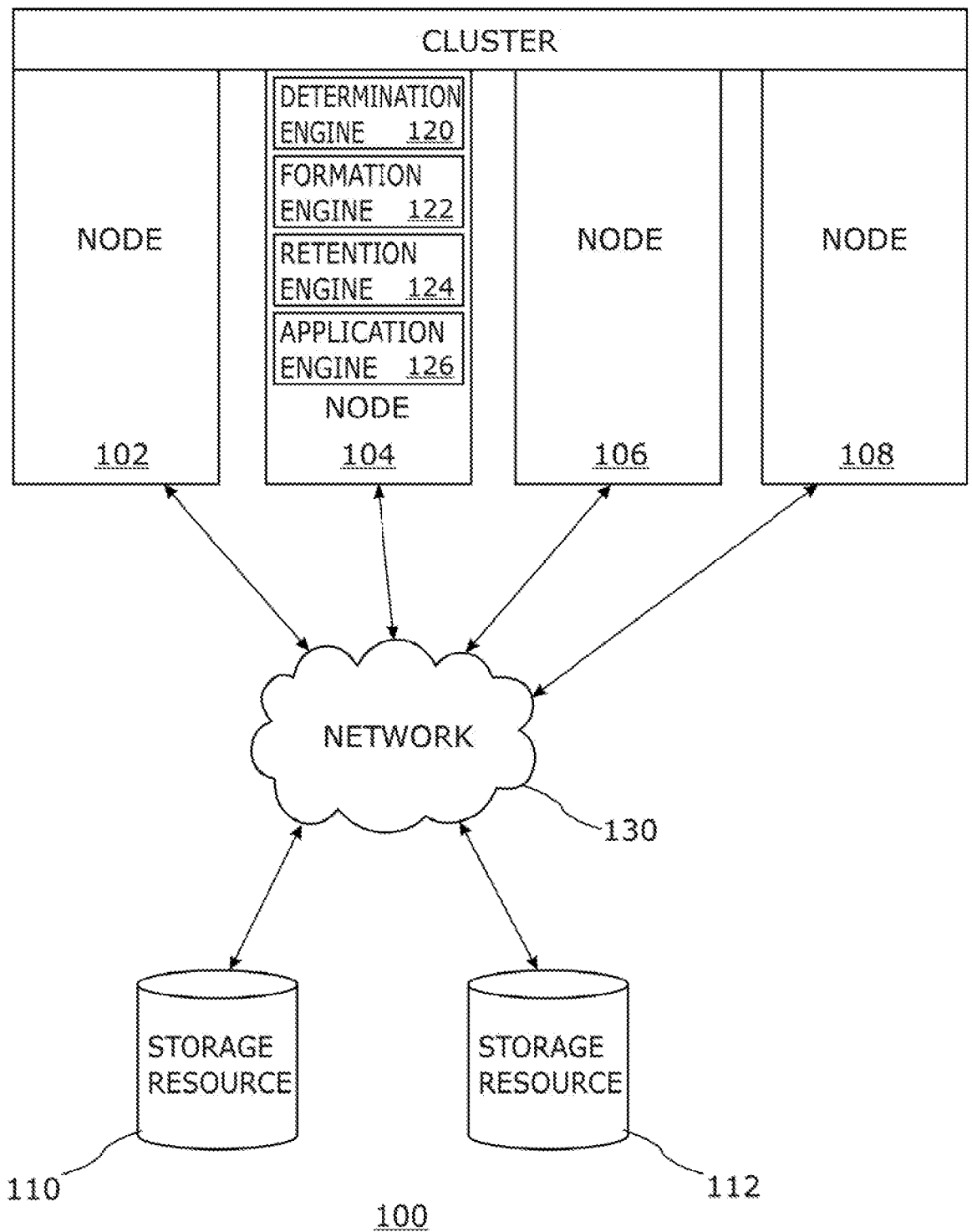
FIG. 1 illustrates an example cluster computer system.

A "cluster computer system" (also "computer cluster" or "cluster") may be defined as a group of computing systems (for example, servers) and other resources (for example, storage, network, etc.) that act like a single system. A computer cluster may be considered as a type of parallel or distributed processing system, which may consist of a collection of interconnected computer systems cooperatively working together as a single integrated resource. In other words, a cluster is a single logical unit consisting of multiple computers that may be linked through a high speed network. A "sub-cluster" may refer to a subset of a cluster. A cluster may be divided into zero or more sub-clusters (or partitions) of live nodes. Each live node has a view of sub-cluster membership. A computing system in a cluster may be referred to as a "node". In an example, each node in a cluster may run its own instance of an operating system.

Clusters may be deployed to improve performance and availability since they basically act as a single, powerful machine. They may provide faster processing, increased storage capacity, and better reliability.

There may be scenarios when an application running on a node of a cluster may become unavailable. This may occur, for example, due to application failure, node failure, network failure, etc. To ensure application availability, a failover mechanism may be implemented wherein, in case of a malfunction, another node may be allowed to take over the application that becomes unavailable due to node or network failure.

Some approaches to failover include bringing down the node or marking the node as ineligible to run the application when the node gets separated from the cluster. For example, in case of split brain scenarios, an external resource (for example, a server) may be used for node fencing or to arbitrate which node may be allowed to take over the application. In another example, in the event of network splits, some approaches allow one sub-cluster to survive whereas other sub-clusters are brought down. This may result in loss of cluster compute and unnecessary failover of applications. In a yet another example, in case of multiple splits where none of the sub-clusters may have the majority, in some approaches the entire cluster may be brought down and applications may not run even though nodes may be available. In a further example, if majority of the nodes are lost at the same time, some approaches may not allow the application to run on the remaining nodes. Needless to say, these are not desirable scenarios.

To address these technical challenges, the present disclosure describes various examples for implementing a cluster computer system. In an example, a first node in a cluster computer system may determine that a second node in the cluster computer system has become unavailable. In response to the determination, the first node may form a first sub-cluster with a plurality of nodes that are communicatively reachable in the cluster computer system. The first node may retain ownership over a first application running on the first node, to the exclusion of the remaining nodes in the first sub-cluster, wherein retaining ownership over the first application comprises controlling access to a storage volume related to the first application. The first node then may attempt to obtain ownership over a second application previously running on the second node before the second node became unavailable. In response to a successful attempt, the first node may obtain ownership over the second application, to the exclusion of the remaining nodes in the first sub-cluster, wherein obtaining ownership over the second application comprises controlling access to a storage volume related to the second application.

The proposed examples describes a clustering system that does not rely on additional external resources for arbitration and/or node fencing. The proposed examples eliminates unnecessary failovers and provides application services even if majority of nodes fail. In case of change in cluster membership due to failures, the proposed cluster system may keep all available nodes alive and ensure that an application is kept running or recovered on one of the sub-clusters or node(s) as the case may be.

FIG. 1 illustrates an example cluster computer system 100. Cluster computer system 100 may include nodes 102, 104, 106, and 108, storage resources 110 and 112. Although four nodes and two storage resources are shown in FIG. 1, other examples of this disclosure may include less or more than four nodes, and less or more than two storage resources.

As used herein, the term "node" may refer to any type of computing device capable of reading machine-executable instructions. Examples of the computing device may include, without limitation, a server, a desktop computer, a notebook computer, a tablet computer, and the like.

Storage resources 110 and 112 may each be a storage device. The storage device may be an internal storage device, an external storage device, or a network attached storage device. Some non-limiting examples of the storage device may include a hard disk drive, a storage disc (for example, a CD-ROM, a DVD, etc.), a storage tape, a solid state drive (SSD), a USB drive, a Serial Advanced Technology Attachment (SATA) disk drive, a Fibre Channel (FC) disk drive, a Small Computer System Interface (SCSI) disk drive, a Serial Attached SCSI (SAS) disk drive, a magnetic tape drive, an optical jukebox, and the like. In an example, storage nodes 104, 106 108, and 110 may each be a Direct Attached Storage (DAS) device, a Network Attached Storage (NAS) device, a Redundant Array of Inexpensive Disks (RAID), a data archival storage system, or a block-based device over a storage area network (SAN). In another example, storage resources 110 and 112 may each be a storage array, which may include a storage drive or plurality of storage drives (for example, hard disk drives, solid state drives, etc.). In an example, storage resources 110 and 112 may each be a distributed storage node, which may be part of a distributed storage system that may include a plurality of storage nodes. In another example, storage resources 110 and 112 may each be a disk array or a small to medium sized server re-purposed as a storage system with similar functionality to a disk array having additional processing capacity.

Storage resources 110 and 112 may each communicate with nodes 102, 104, 106, and 108 via a suitable interface or protocol such as, but not limited to, Fibre Channel, Fibre Connection (FICON), Internet Small Computer System Interface (iSCSI), HyperSCSI, and ATA over Ethernet.

In an example, physical storage space provided by storage resources 110 and 112 may be presented as a logical storage space to nodes 102, 104, 106, and 108. Such logical storage space (also referred as "logical volume", "virtual disk", or "storage volume") may be identified using a "Logical Unit Number" (LUN). In another example, physical storage space provided by storage nodes may be presented as multiple logical volumes to nodes 102, 104, 106, and 108. In such case, each of the logical storage spaces may be referred to by a separate LUN. In an example, a storage volume(s) may be distributed across a plurality of storage nodes.

In an example, nodes 102, 104, 106, and 108, may be communicatively coupled via a computer network. In an example, nodes 102, 104, 106, and 108 may be communicatively coupled with storage resources 110 and 112 via a separate computer network 130. Computer network 130 may be a wireless or wired network. Computer network 130 may include, for example, a Local Area Network (LAN), a Wireless Local Area Network (WAN), a Metropolitan Area Network (MAN), a Storage Area Network (SAN), a Campus Area Network (CAN), or the like. Further, computer network 130 may be a public network (for example, the Internet) or a private network (for example, an intranet).

In the example of FIG. 1, node 104 may include a determination engine 120, a formation engine 122, a retention engine 124, and an application engine 126. For the sake of simplicity in illustration, node 104 is shown to include determination engine 120, formation engine 122, retention engine 124, and application engine 126. However, any of the other nodes (for example, 108) in cluster computer system 100 may include determination engine 120, formation engine 122, retention engine 124, and application engine 126.

Engines 120, 122, 124, and 126 may each include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of node 104. In some examples, the at least one machine-readable storage medium may store instructions that, when executed by the at least one processing resource, at least partially implement some or all engines of node 104. In such examples, node 104 may include the at least one machine-readable storage medium storing the instructions and the at least one processing resource to execute the instructions.

Figure 2A:
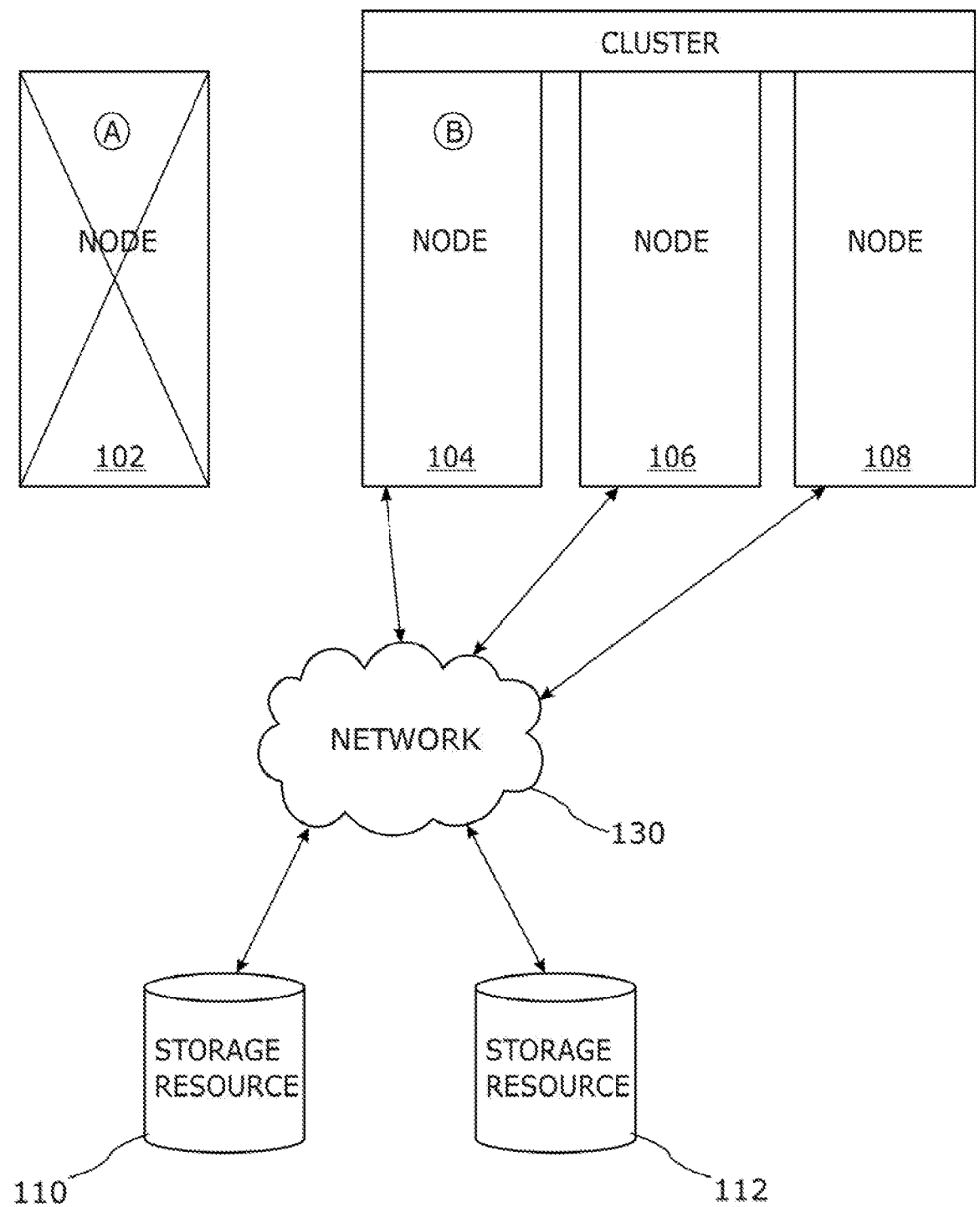
FIGS. 2A to 2C illustrate various other examples of a cluster computer system.

In an example, determination engine 120 on node 104 ("first node") may determine that a second node (for example, 102) in cluster computer system 100 has become unavailable. Second node 102 may become unavailable due to, for example, a failure of second node 102 and/or a network failure. In an example, determination engine 120 may determine that second node 102 has become unavailable if second node 102 does not respond to a message sent by first node 104 within a pre-defined period. In another example, determination engine 120 may determine that second node 102 has become unavailable if first node 104 does not receive a message from second node 104 within a pre-defined period. FIG. 2A illustrates a scenario where a node 102 in cluster computer system 100 may become unavailable.

In response to the determination by determination engine 120 that second node 102 has become unavailable, formation engine 122 may be used by first node to form a first sub-cluster with a plurality of nodes that are communicatively reachable in cluster computer system 100. For example, in the context of FIG. 2A, if node 102 becomes unavailable, node 104 may form a cluster with nodes 106 and 108. As used herein, nodes that are "communicatively reachable" may include nodes with whom data may be exchanged over a network.

Subsequent to the formation of the first sub-cluster, retention engine 124 may be used to retain ownership over a first application running on first node 104, to the exclusion of the remaining nodes in the first sub-cluster. For example, in the context of FIG. 2A, subsequent to the formation of the first sub-cluster, node 104 may retain ownership over application B which is running on node 104. In an example, retaining "ownership" over the first application may comprise controlling access to a storage resource (for example, a storage volume) related to the first application. The storage resource may store, for example, data and/or metadata related to the first application. In the context of FIG. 2A, data related to application B may be stored, for example, on storage resource 112. In an example, the first application may be a distributed application.

In an example, the access to a storage resource may be controlled by using a storage arbitration system such as SCSI 3 Persistent Reservations. SCSI 3 Persistent Reservations may be used by retention engine 124 on node 104 to control access to storage resource 112 that stores data related to application B. SCSI Persistent Reservations provide a mechanism to register and reserve access to a shared SCSI device (for example, 112). SCSI 3 Persistent Reservations uses a concept of registration and reservation. Nodes that participate, register a key with the LUN. Each node registers its own key. After this, registered nodes may establish a reservation. A node wishing to eject another node may register, clear or preempt the other registered initiators.

SCSI Persistent Reservations are set by an initiator node. The same initiator may perform a SCSI release on the affected LUN. SCSI 3 Persistent Reservations may allow an initiator node (for example, 104) to obtain ownership over a storage resource (for example, 112). Using SCSI 3 Persistent Reservations, multiple nodes may register their reservation keys with the shared device and establish a reservation. SCSI 3 Persistent Reservations allow multiple nodes to access a storage device while at the same time blocking access to other nodes. Referring to FIG. 2A, node 104 may act as an initiator node to set a reservation on storage resource 112 (or a specific LUN) in order to prevent another node (for example, 106 and 108) from making changes to storage resource 112.

Retaining ownership over first application (for example, application B) may involve releasing by node 104, who is the current owner of the first application, the registration of all other nodes, but keeping its own reservation and registration intact with storage resource 112 related to the first application. As a result, other nodes may be "excluded" from accessing the storage resource. Just node 104, the current owner, may continue to have access to the first application and no other node.

Subsequent to retaining ownership over the first application, application engine 126 on first node 104 may attempt to obtain ownership over a second application after a predefined period. In an example, the second application may include an application that was previously running on the second node before the second node became unavailable. For example, in the context of FIG. 2A, application engine 126 on first node 104 may attempt to obtain ownership over a second application ("application A") that was earlier running on the second node before the second node became unavailable. In an example, the data related to the second application may be present on storage resource 110.

In an example, attempt by first node 104 to obtain ownership over the second application is parallel to an attempt by other nodes of the first sub-cluster to obtain ownership over the second application. In other words, all the nodes in the first sub-cluster (including first node 104) may simultaneously try to gain ownership over the second application. In another example, attempt by first node 104 to obtain ownership over the second application is parallel to an attempt by the remaining nodes of the first sub-cluster and nodes of another sub-cluster (for example, a second sub-cluster) in cluster computer system 100, to obtain ownership over the second application.

In response to a successful attempt, application engine 126 may be used by first node 104 to obtain ownership over the second application, to the exclusion of remaining nodes in the first sub-cluster and nodes in any other sub-cluster (for example, a second sub-cluster) of cluster computer system 100. Retaining ownership over the second application may comprise controlling, by application engine 126 on first node 104, access to a storage volume related to the second application. In the context of FIG. 2A, in response to a successful attempt, first node 104 may obtain ownership over application A and retain ownership over the application data present on storage resource 110. In an example, SCSI 3 Persistent Reservations may be used by application engine 126 on node 104 to control access to storage resource 110 that stores data related to application. Obtaining ownership over the second application ("application A") by node 104 may involve releasing by node 104 the registration of all other nodes, but keeping its own reservation and registration intact with storage resource 110 related to the second application. Once first node 104 i.e. the new owner obtains ownership over the second application, first node 104 may recover the second application on itself and register the remaining nodes of the first sub-cluster with storage resource 110 related to the second application. In an example, the second application may be a distributed application.

To provide another example, consider a four-node cluster (for example, 102, 104, 106, and 108) where nodes 102, 104, and 108 each have an application running on them, for example, application A is running on node 102, application B on node 104, and application C on node 108. In case of a network split, three sub-clusters may be formed. For example, node 102 may isolate and form a first sub-cluster, node 104 may isolate and form a second sub-cluster, node 106 may fail, and node 108 may isolate and form a third sub-cluster. Now each node may try to retain ownership over the applications which are running on them. During this phase, which may be a configurable time out period (for example, thirty seconds), there is no contention between nodes. Thus, node 102 and node 104 may retain ownership over the applications A and B, respectively, by keeping their own reservation and registration intact with storage resources related to the respective applications, and removing association of all other nodes. Since node 106 has failed, the application disk belonging to application C may not have any owner.

Post the time out duration, all nodes in parallel may try to get control of application disks of applications running on other nodes. Thus, node 102 may try to obtain control over application disk of applications B and C, node 104 may try to obtain control over application disk of applications A and C, and node 108 may try to obtain control over application disk of applications A, B, and C. When node 102 tries, it may find application B's disk may already owned and its association to the same removed. Since applications C's disk may be open, node 102 may race to obtain its ownership, and if no other node has already beaten it, node 102 may take control over applications C's disk. In case some other node has already won the ownership, node 102 may find that its association to applications on C's disk does not exist anymore as the node which won the race may have taken control and released association of all other nodes. Similar process may happen on all nodes.

In an example, application engine 126 may identify the remaining nodes in the first sub-cluster as backup nodes for the first application. In case first node 104 becomes unavailable, one of the backup nodes may acquire ownership over the first application. In an example, application engine 126 may identify the remaining nodes in the first sub-cluster as backup nodes for the second application. In case first node 104 becomes unavailable, one of the backup nodes may acquire ownership over the second application.

In an example, determination engine 120 may determine that the second node in the cluster computer system has become available. In response to the determination, first node may include the second node in the first sub-cluster.

Figure 2B:
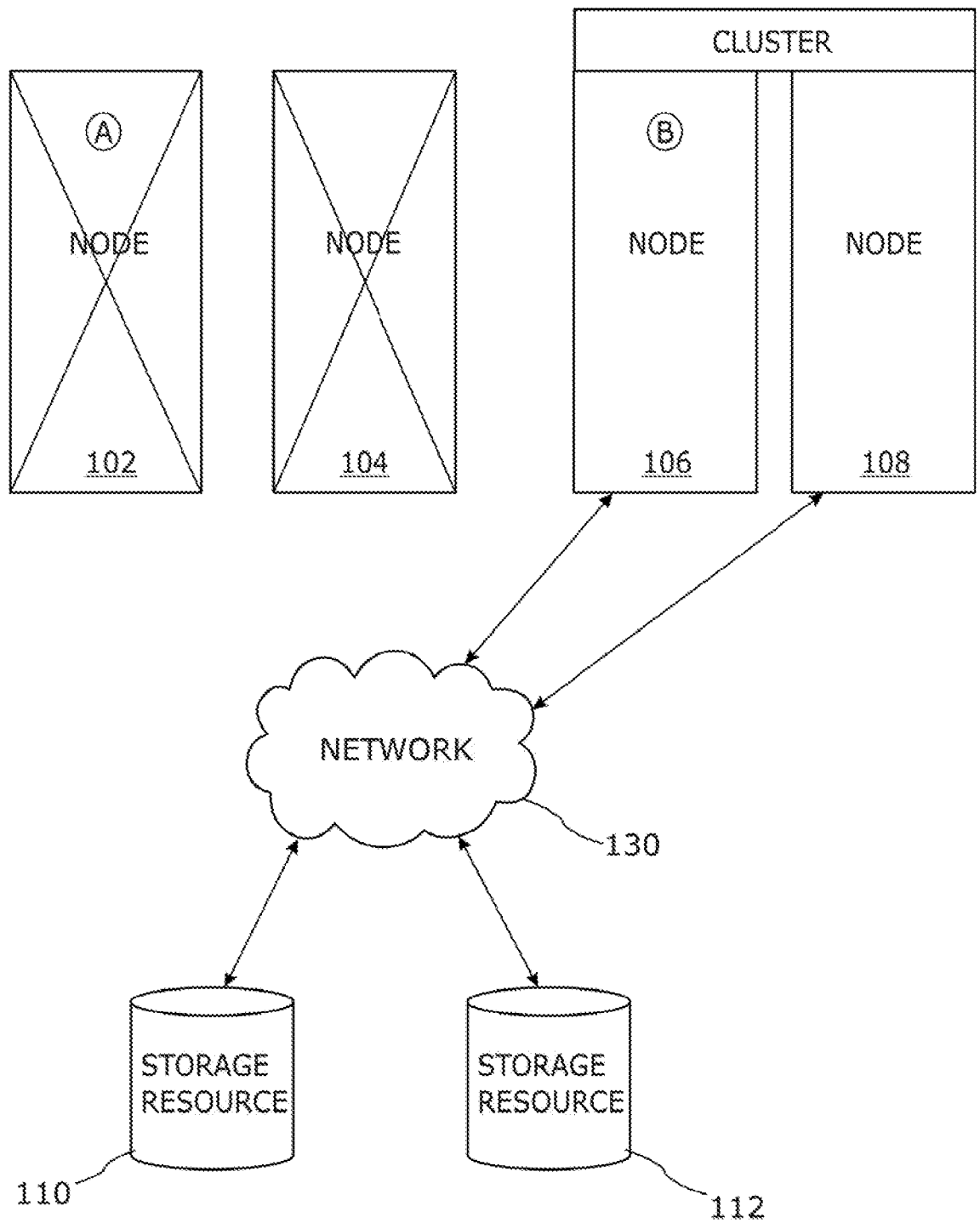

FIG. 2B illustrates a scenario where half of the nodes (for example, nodes 102 and 104) in cluster computer system 100 may become unavailable, for example, due to a network failure. In such a scenario, in response to a determination by determination engine 120 on a first node (for example, node 106) that a node (for example, 102 or 104) has become unavailable, formation engine 122 may form a first sub-cluster with node 108.

Subsequent to the formation of the first sub-cluster, retention engine 124 may retain ownership over a first application (for example, application B) running on first node 106, to the exclusion of other nodes in the first sub-cluster. Retaining ownership over the first application may comprise controlling access to a storage resource (for example, 112) related to the first application. Node 106 may act as an initiator node to set a reservation on storage resource 112 in order to prevent node 108 from making changes to storage resource 112.

Subsequent to retaining ownership over the first application, application engine 126 on first node 106 may attempt to obtain ownership over a second application after a predefined period. In an example, the second application may include "application A" that was earlier running on a second node (for example, 102) before the second node became unavailable. In an example, the second node was a part of half of the nodes that become unavailable. In an example, the data related to the second application may be present on storage resource 110.

In response to a successful attempt, application engine 126 on first node 106 may obtain ownership over application A, to the exclusion of node 108 in the first sub-cluster. In an example, SCSI 3 Persistent Reservations may be used by application engine 126 on node 106 to control access to storage resource 110 that stores data related to application A. First node 106 may recover the second application on itself and register node 108 with storage resource 110 as a standby node for the first application and the second application.

Figure 2C:
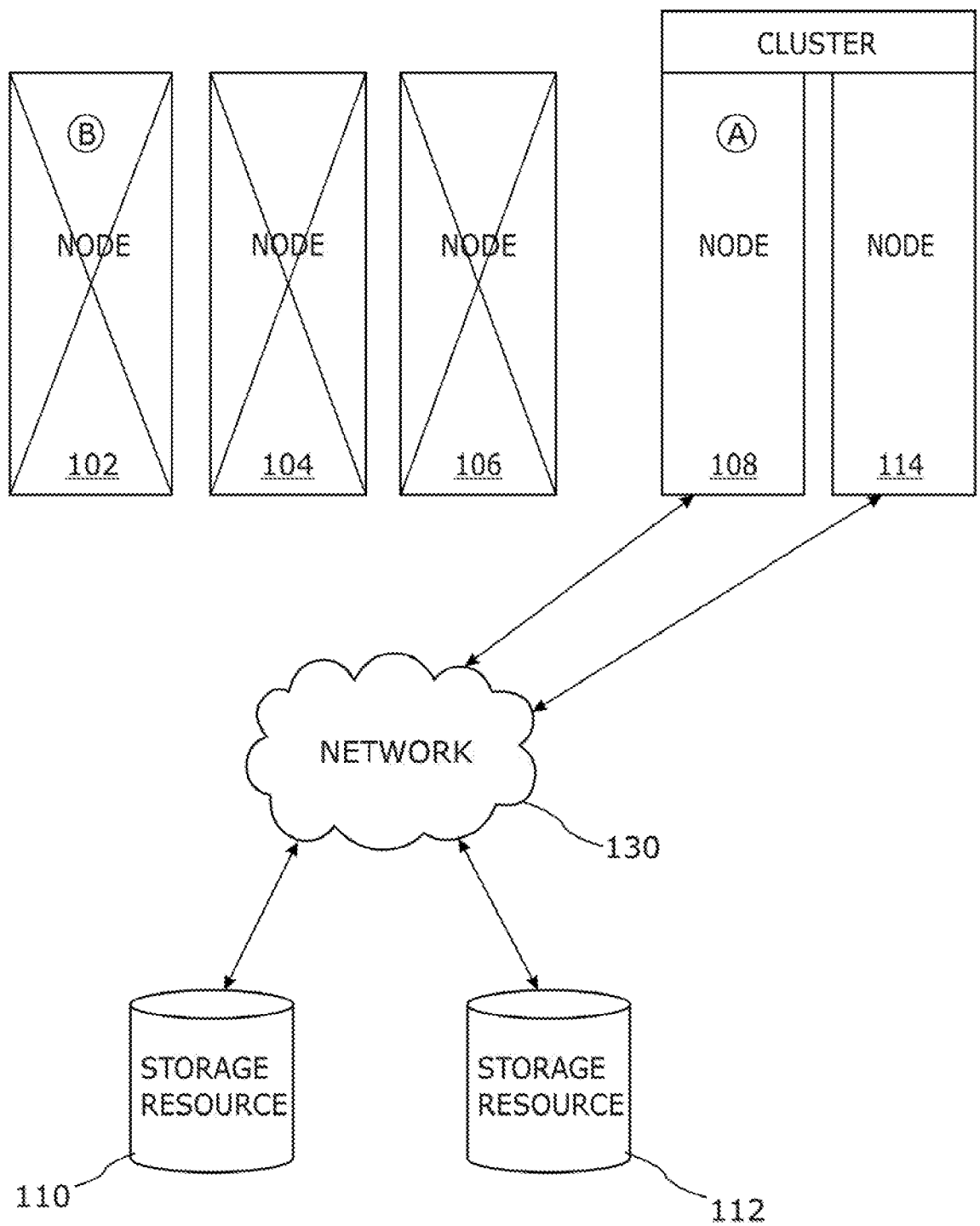

FIG. 2C illustrates a scenario where majority of the nodes (for example, nodes 102, 104, and 106) in cluster computer system 100 may become unavailable, for example, due to a network failure. In such a scenario, in response to a determination by determination engine 120 on a first node (for example, node 108) that a node (for example, 102, 104, or 106) has become unavailable, formation engine 122 may form a first sub-cluster with node 114.

Subsequent to the formation of the first sub-cluster, retention engine 124 may retain ownership over a first application (for example, application A) running on first node 108, to the exclusion of other nodes in the first sub-cluster. Retaining ownership over the first application may comprise controlling access to a storage resource (for example, 110) related to the first application. Node 108 may act as an initiator node to set a reservation on storage resource 110 in order to prevent node 114 from making changes to storage resource 110.

Subsequent to retaining ownership over the first application, application engine 126 on first node 108 may attempt to obtain ownership over a second application after a predefined period. In an example, the second application may include "application B" that was earlier running on a second node (for example, 102) before the second node became unavailable. In an example, the second node was a part of the majority of nodes that become unavailable. In an example, the data related to the second application may be present on storage resource 112.

In response to a successful attempt, application engine 126 on first node 108 may obtain ownership over application A, to the exclusion of node 114 in the first sub-cluster. In an example, SCSI 3 Persistent Reservations may be used by application engine 126 on node 108 to control access to storage resource 112 that stores data related to application B. First node 108 may recover the second application on itself, and register node 114 with storage resource 112 as a standby node for the first application and the second application.

Figure 3:
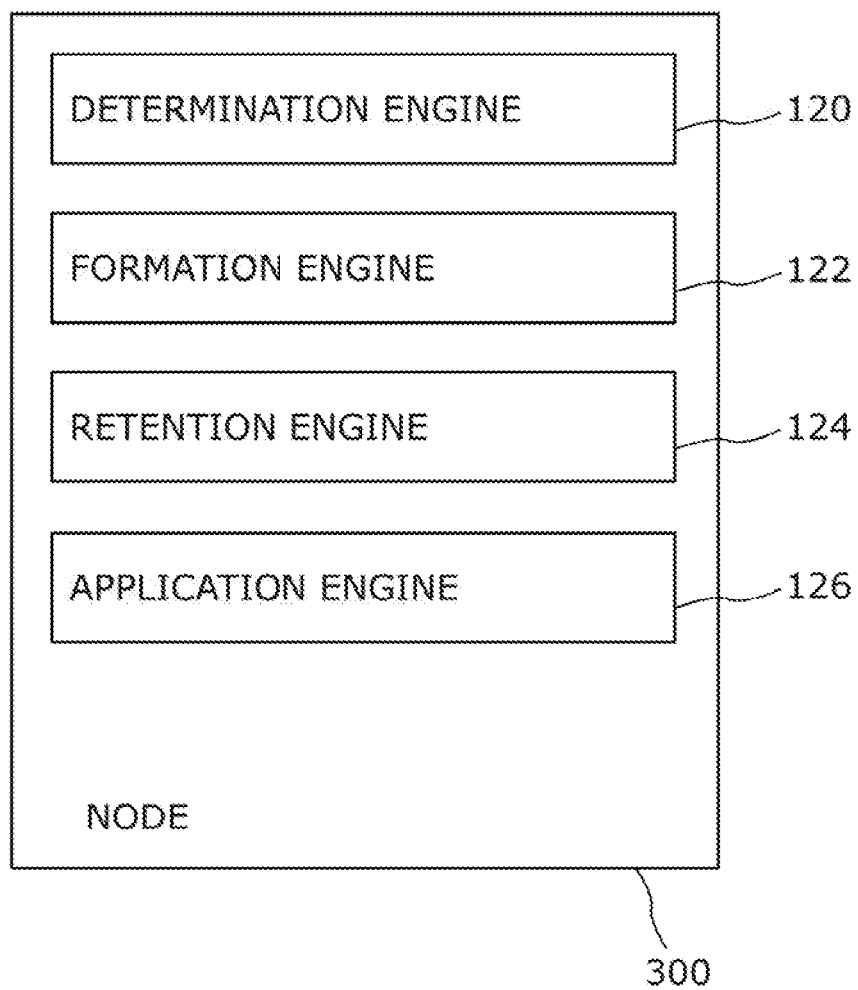
FIG. 3 illustrates an example node of a cluster computer system.

FIG. 3 illustrates a system 300 of a cluster computer system. In an example, system 300 may be similar to a node (for example, 102, 104, 106, or 108) of cluster computer system 100 of FIG. 1, as described above. Accordingly, components of system 300 that are similarly named and illustrated in reference to FIG. 1 may be considered similar.

In an example, system 300 may include any type of computing device capable of reading machine-executable instructions. Examples of the computing device may include, without limitation, a server, a desktop computer, a notebook computer, a tablet computer, and the like.

In an example, system 300 may include a determination engine 120, a formation engine 122, a retention engine 124, and an application engine 126. In an example, the aforesaid components of system 300 may be implemented as machine-readable instructions stored on a machine-readable storage medium. The machine-readable storage medium storing such instructions may be integrated with the system 300, or it may be an external medium that may be accessible to the system 300.

In an example, determination engine 120 may determine that a second node in the cluster computer system has become unavailable. In response to the determination, formation engine 122 may be used to form a first sub-cluster with a plurality of nodes that are communicatively reachable in the cluster computer system. Retention engine 124 may be used to retain ownership over a first application running on the node, to the exclusion of the nodes in the first sub-cluster. Retaining ownership over the first application may comprise controlling access to a storage volume related to the first application. Application engine 126 may attempt to obtain ownership over a second application previously running on the second node before the second node became unavailable. In an example, the attempt is parallel to an attempt by the nodes in the first sub-cluster to obtain ownership over the second application. In response to a successful attempt, application engine 126 may obtain ownership over the second application, to the exclusion of the nodes in the first sub-cluster. Obtaining ownership over the second application may comprise controlling access to a storage volume related to the second application.

Figure 4:
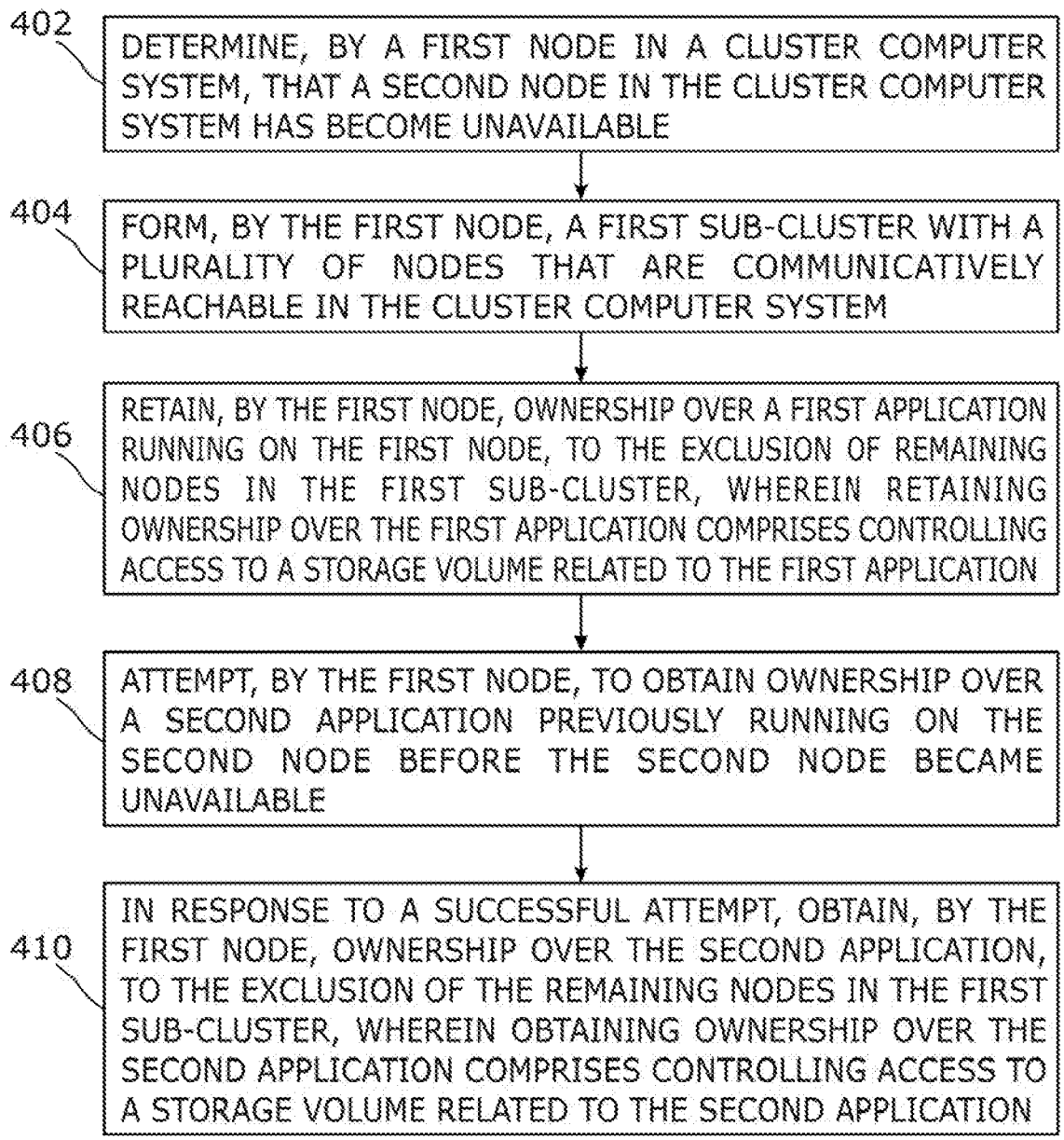
FIG. 4 illustrates an example method of implementing a cluster computer system.

FIG. 4 illustrates a method 400 of implementing a cluster computer system, according to an example. The method 400, which is described below, may be executed on a system such a node (for example, 102, 104, 106, or 108) of cluster computer system 100 of FIG. 1 or system 300 of FIG. 3. However, other computing platforms may be used as well.

At block 402, a first node in a cluster computer system (for example, 100) may determine that a second node in the cluster computer system has become unavailable. In an example, the determination may include sending, by the first node, a message to the second node; waiting for a predefined time period; and in case of non-receipt of a response to the message from the second node, determining that the second node is unavailable.

At block 404, in response to the determination, the first node may identify a plurality of nodes that are communicatively reachable in the cluster computer system. The first node may then form a first sub-cluster with the plurality of nodes.

At block 406, the first node may retain ownership over a first application running on the first node, to the exclusion of remaining nodes in the first sub-cluster. Retaining ownership over the first application comprises controlling access to a storage volume related to the first application.

At block 408, the first node may attempt to obtain ownership over a second application previously running on the second node before the second node became unavailable. The attempt by the first node is parallel to an attempt by other nodes of the first sub-cluster to obtain ownership over the second application.

At block 410, in response to a successful attempt, the first node may obtain ownership over the second application, to the exclusion of remaining nodes in the first sub-cluster. Obtaining ownership over the second application may comprise controlling access to a storage volume related to the second application.

Figure 5:
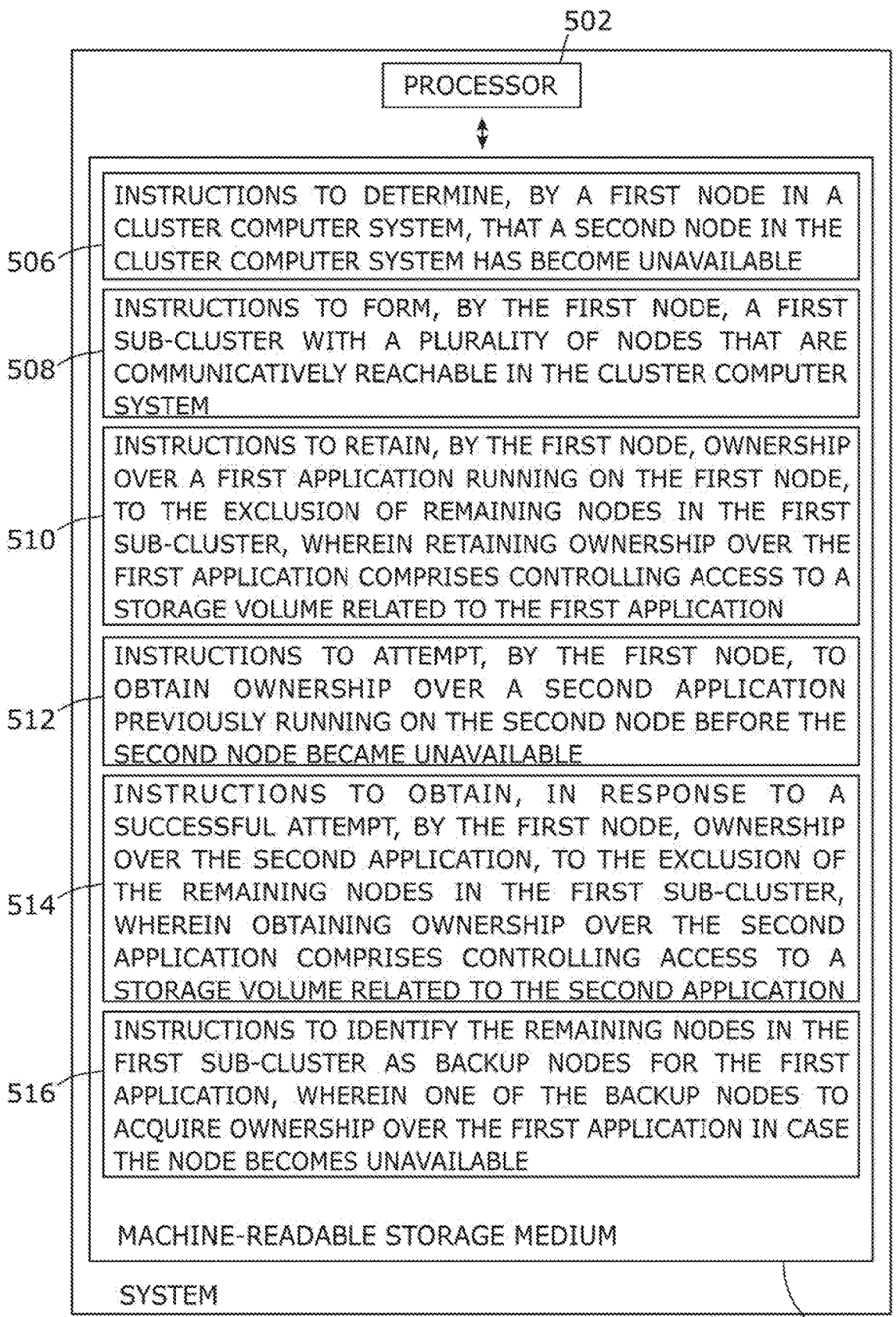
FIG. 5 is a block diagram of an example system including instructions in a machine-readable storage medium for implementing a cluster computer system.

FIG. 5 is a block diagram of an example system 500 including instructions in a machine-readable storage medium for implementing a cluster computer system. System 500 includes a processor 502 and a machine-readable storage medium 504 communicatively coupled through a system bus. In an example, system 500 may be analogous to nodes 102, 104, 106, or 108 of FIG. 1 or system 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like.

In an example, machine-readable storage medium 504 may be a non-transitory machine-readable medium. Machine-readable storage medium 504 may store monitoring instructions 506, 508, 510, 512, 514, and 516. In an example, instructions 506 may be executed by processor 502 to determine, by a first node in a cluster computer system, that a second node in the cluster computer system has become unavailable. Instructions 508 may be executed by processor 502 to form, by the first node, a first sub-cluster with a plurality of nodes that are communicatively reachable in the cluster computer system. Instructions 510 may be executed by processor 502 to retain, by the first node, ownership over a first application running on the first node, to the exclusion of remaining nodes in the first sub-cluster, wherein retaining ownership over the first application comprises controlling access to a storage volume related to the first application. Instructions 512 may be executed by processor 502 to attempt, by the first node, to obtain ownership over a second application previously running on the second node before the second node became unavailable. Instructions 514 may be executed by processor 502 to in response to a successful attempt, obtain, by the first node, ownership over the second application, to the exclusion of the remaining nodes in the first sub-cluster, wherein obtaining ownership over the second application comprises controlling access to a storage volume related to the second application. Instructions 516 may be executed by processor 502 to identify the remaining nodes in the first sub-cluster as backup nodes for the first application, wherein one of the backup nodes to acquire ownership over the first application in case the node becomes unavailable.

For the purpose of simplicity of explanation, the example method of FIG. 4 is shown as executing serially, however it is to be understood and appreciated that the present and other examples are not limited by the illustrated order. The example systems of FIGS. 1, 2A to 2C, 3 and 5, and method of FIG. 4 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution.

The invention claimed is:

1. A method comprising:
   determining, by a first node of a plurality of nodes of a cluster computer system, that a second node of the plurality of nodes has become unavailable, wherein the plurality of nodes includes a third node;
   responsive to determining that the second node has become unavailable, forming, by the first node, a first sub-cluster with a subset of nodes of the plurality of nodes which are communicatively reachable by the first node in the cluster computer system;
   imposing a predefined timeout period concurrently on the first and third nodes, wherein during the predefined timeout period, the first node is prevented from attempting to acquire ownership of applications running on nodes of the plurality of nodes other than the first node, and the third node is prevented from attempting to acquire ownership of applications running on nodes of the plurality of nodes other than the third node;
   during the predefined timeout period, retaining, by the first node, ownership over a first application running on the first node, to the exclusion of remaining nodes in the first sub-cluster, wherein retaining ownership over the first application comprises controlling access to a storage volume related to the first application;
   in response to expiration of the pre-defined timeout period, attempting, by the first node, to obtain ownership over a second application previously running on the second node before the second node became unavailable; and
   in response to a successful attempt, obtaining, by the first node, ownership over the second application, to the exclusion of the remaining nodes in the first sub-cluster, wherein obtaining ownership over the second application comprises controlling access to a storage volume related to the second application.

2. The method of claim 1, further comprising, in response to the expiration of the pre-defined timeout period, other another node of the subset of nodes attempting, in parallel with the first node, to obtain ownership over the second application.

3. The method of claim 1, further comprising, in response to the expiration of the pre-defined timeout period, a fourth node in a second sub-cluster wherein attempting, in parallel with the first node, to obtain ownership over the second application.

4. The method of claim 3, wherein the second sub-cluster comprising a plurality of nodes including the fourth node, the method further comprising:
   the fourth node obtaining ownership over the second application to the exclusion of the remaining node or nodes of the plurality of nodes of the second sub-cluster.

5. The method of claim 1, wherein the second node is a part of a majority of nodes that become unavailable in the cluster computer system.

6. The method of claim 1, wherein the second node is unavailable due to a network failure in the cluster computer system.

7. A first node of a plurality of nodes of a cluster computer system, the first node comprising:
a processor; and
a non-transitory machine-readable storage medium having instructions stored thereon which, when executed by the processor, cause the processor to:
determine that a second node of the plurality of nodes has become unavailable;
responsive to determining that the second node has become unavailable, form a first sub-cluster with a subset of nodes of the plurality of nodes which are communicatively reachable by the first node in the cluster computer system;
comply with a predefined timeout period imposed concurrently on the first node and a third node of the plurality of nodes, wherein during the predefined timeout period, the first node is prevented from attempting to acquire ownership of applications running on nodes of a plurality of nodes other than the first node, and the third node is prevented from attempting to acquire ownership of applications running on nodes of the plurality of nodes other than the third node;
during the predefined timeout period, retain ownership over a first application running on the first node, to the exclusion of remaining nodes in the first sub-cluster, by controlling access to a storage volume related to the first application;
in response to expiration of the pre-defined timeout period, attempt to obtain ownership over a second application previously running on the second node before the second node became unavailable, wherein the attempt is parallel to an attempt by the remaining nodes in the first sub-cluster to obtain ownership over the second application; and
in response to a successful attempt, obtain ownership over the second application, to the exclusion of the remaining nodes in the first sub-cluster by controlling access to a storage volume related to the second application.

8. The first node of claim 7, wherein the instructions, when executed by the processor, cause the processor to identify the remaining nodes in the first sub-cluster as backup nodes for the first application, wherein one of the backup nodes is to acquire ownership over the first application in case the first node becomes unavailable.

9. The first node of claim 7, wherein the instructions, when executed by the processor, cause the processor to:
determine that the second node in the cluster computer system has become available; and
in response to the determination, include the second node in the first sub-cluster.

10. The first node of claim 9, wherein the instructions, when executed by the processor, cause the processor to identify the second node as a backup node for the first application, wherein the backup node is to acquire ownership over the first application in case the first node becomes unavailable.

11. The first node of claim 9, wherein the instructions, when executed by the processor, cause the processor to identify the second node as a backup node for the second application, wherein the backup node is to acquire ownership over the second application in case the first node becomes unavailable.

12. The first node of claim 7, wherein the second node is unavailable due to a failure of the second node.

13. The first node of claim 7, wherein the first application is a distributed application.

14. A non-transitory machine-readable storage medium comprising instructions, the instructions executable by a processor to:
determine, by a first node of a plurality of nodes of a cluster computer system, that a second node of the plurality of nodes has become unavailable;
responsive to determining that the second node has become unavailable, form, by the first node, a first sub-cluster with a subset of nodes of the plurality of nodes which communicatively reachable by the first node in the cluster computer system;
comply with a predefined timeout period, wherein the predefined timeout period is imposed concurrently on the first node and a third node of the plurality of nodes, and during the predefined timeout period, the first node is prevented from attempting to acquire ownership of applications running on nodes of the plurality of nodes other than the first node and the third node is prevented from attempting to acquire ownership of applications running on nodes of the plurality of nodes other than the third node;
retain, by the first node, ownership over a first application running on the first node, to the exclusion of remaining nodes in the first sub-cluster, wherein retaining ownership over the first application comprises controlling access to a storage volume related to the first application;
in response to the expiration of the pre-defined timeout period, attempt, by the first node, to obtain ownership over a second application previously running on the second node before the second node became unavailable;
in response to a successful attempt, obtain, by the first node, ownership over the second application, to the exclusion of the remaining nodes in the first sub-cluster, wherein obtaining ownership over the second application comprises controlling access to a storage volume related to the second application; and
identify the remaining nodes in the first sub-cluster as backup nodes for the first application, wherein one of the backup nodes to acquire ownership over the first application in case the node becomes unavailable.

15. The storage medium of claim 14, further comprising instructions to:
identify, by the first node, the remaining nodes in the first sub-cluster as backup nodes for the second application.

16. The storage medium of claim 15, wherein one of the backup nodes is to acquire ownership over the second application in case the first node becomes unavailable.

17. The storage medium of claim 14, wherein the second node is a part of more than half of the nodes that become unavailable in the cluster computer system.

18. The storage medium of claim 14, wherein the second application is a distributed application.

19. The storage medium of claim 14, further comprising instructions to:
determine that the second node in the cluster computer system has become available; and in response to the determination, include the second node in the first sub-cluster.

\* \* \* \* \*